US008403418B2

(12) United States Patent
Lindell

(10) Patent No.: US 8,403,418 B2
(45) Date of Patent: Mar. 26, 2013

(54) MULTI FUNCTION CHAIR WITH ADJUSTABLE ARMREST

(75) Inventor: Tom Lindell, Kista (SE)

(73) Assignee: CombiMobil AB, Balsta (SE)

( * ) Notice: Subject to any disclaimer, the term of this patent is extended or adjusted under 35 U.S.C. 154(b) by 364 days.

(21) Appl. No.: 12/740,705

(22) PCT Filed: Oct. 29, 2008

(86) PCT No.: PCT/SE2008/051222

§ 371 (c)(1), (2), (4) Date: Apr. 30, 2010

(87) PCT Pub. No.: WO2009/058077

PCT Pub. Date: May 7, 2009

(65) Prior Publication Data

US 2010/0259085 A1 Oct. 14, 2010

(30) Foreign Application Priority Data

Oct. 30, 2007 (SE) ...................................... 0702401

(51) Int. Cl.
*B60N 2/46* (2006.01)

(52) U.S. Cl. .............. 297/411.39; 297/354.13; 297/359; 297/411.32; 297/411.35; 297/411.36

(58) Field of Classification Search ............. 297/354.13, 297/359, 411.32, 411.35, 411.36, 411.39
See application file for complete search history.

(56) References Cited

U.S. PATENT DOCUMENTS 3,661,421 A * 5/1972 Johnson ................... 297/411.32
4,628,552 A * 12/1986 Magistretti ......................... 5/52
4,887,866 A 12/1989 Rusin
4,978,170 A * 12/1990 Pelz et al. ................ 297/411.39
5,181,762 A * 1/1993 Beumer ......................... 297/358
6,250,717 B1 * 6/2001 Porcheron .................. 297/411.3
7,585,019 B2 * 9/2009 Huang et al. .................... 297/86

FOREIGN PATENT DOCUMENTS

JP 2000-342375 12/2000
JP 2002-85463 3/2002

OTHER PUBLICATIONS

International Search Report dated Jan. 23, 2009, from corresponding PCT application.

* cited by examiner

*Primary Examiner* — Laurie Cranmer
(74) *Attorney, Agent, or Firm* — Young & Thompson

(57) ABSTRACT

A chair, includes a seat structure and a backrest structure arranged pivotally to the seat structure. An armrest is arranged pivotally to the backrest structure through a pivotal connection, and a link mechanism is journalled to the structures of the seat and the backrest, respectively, the link mechanism actuating and controlling the armrest to maintain its pivotal orientation in any pivotal position of the backrest relative to the seat. The armrest is adjustable in the length direction of the backrest through the pivotal connection which is arranged displaceable on the backrest structure, and the pivotal orientation of the armrest is controlled via a sliding engagement between a lever arm, adjoining the armrest at an angle thereto, and an actuator link included in the link mechanism and displaceable thereby with respect to the backrest so as to extend substantially in the length direction of the backrest in all its positions of displacement.

13 Claims, 4 Drawing Sheets

MULTI FUNCTION CHAIR WITH ADJUSTABLE ARMREST

TECHNICAL FIELD OF INVENTION

The present invention relates to a chair incorporating multiple functions. More precisely, the invention relates to a chair comprising a seat and a backrest arranged pivotally thereto, wherein the backrest is pivotally adjustable between raised seating conditions and lowered reclining or bed conditions. An armrest is arranged pivotally on the backrest through a pivot connection, and a link mechanism which is journalled at or near the seat actuates and controls the armrest for maintaining its angular orientation in any pivotal position of the backrest with respect to the seat.

BACKGROUND AND PRIOR ART

In the nursing of immobilized patients, e.g., a multi function chair finds versatile use in many situations. As a mobilizer means, the multi function chair can be used as a roller chair that provides mobility, as support for patients that need training in standing and seated positions, as a bed for examination and treatment, as a means for assisting nursing personnel in the moving of a patient to and from a bed, etc. A multi function chair for such purpose typically includes a mobile carriage, a seat arranged pivotally on the carriage and adjustable between lowered seated and lying positions and raised standing positions, and a backrest arranged pivotally to the seat and adjustable between raised seated and standing positions and lowered reclining and lying positions. Typically, a leg rest is pivotally arranged with the seat opposite to the backrest, extending the seat when in a raised position in order to provide support for a patient's legs in reclining and lying positions, as well as stabilizing the patient in standing training situations. A footrest may further be attached in a free lower end of the leg rest.

An armrest is typically arranged on each side of the backrest for comfort and support. In order to compensate and adapt the angular position of an armrest to different inclinations of the seat and backrest, the armrest may be pivotally arranged to the backrest.

To this purpose, JP 2002-85463 of FIG. 1 disclose a multi function chair comprising a link mechanism which is journalled at or near a seat and in operative engagement with an armrest such that the link mechanism actuates the armrest for pivoting motion about its pivotal connection to a backrest, in result of an angular adjustment of the backrest relative to the seat. The link mechanism is arranged and dimensioned such that the armrest, in any pivotal position of the seat and the backrest in seating, lying and standing conditions, always maintains its angular orientation relative to an undercarriage of the chair, i.e. typically a substantially horizontal position.

However, patients are individual in size and constitution of body. Poor comfort and support is offered when the height of the armrest above the seat is not adaptable to the patient. This is a problem still to be addressed in the prior art multi function chairs, represented by the cited reference.

SUMMARY OF INVENTION

An object for the present invention is thus to provide a chair having an armrest which is adjustable with respect to its height above the seat, and which still substantially maintains its angular orientation in any pivotal relation between the seat and backrest, respectively.

This object is met in a chair as recited in claim 1. Preferred embodiments of the invention are further specified in the subordinated claims.

Briefly, in a chair or a multi function chair arranged substantially as explained above, the armrest is adjustable in the length direction of the backrest through the pivotal connection which is arranged displaceable on the backrest structure, and the pivotal orientation of the armrest is controlled via a sliding engagement between a lever arm, adjoining the armrest at an angle thereto, and an actuator link comprised in a link mechanism and displaceable thereby with respect to the backrest so as to extend substantially in the length direction of the backrest in all its positions of displacement.

In a preferred embodiment, the displaceable engagement between link mechanism and armrest is achieved by means of a runner arranged in the end of the lever arm, and which is caused to slide along the actuator link under displacement. In that end of the lever arm which is remote from the runner, the lever arm adjoins the armrest at an angle thereto.

Normally, the link mechanism is arranged to move the actuator link in parallel or near-parallel displacement in result of a change of pivotal position of the backrest relative to the seat, or relative to an undercarriage of the chair. However, other geometrical design of the link mechanism may be advantageous in applications where a non-continuous or progressive pivoting of the armrest would be desirable.

The actuator link is pivotally connected to first and second link members, each in succession pivotally supported on the backrest. The first and second link members are interconnected by a push rod which in an inner end is pivotally connected and journalled at or near the seat, or to an undercarriage close to the seat. The first and second link members are parallel links driven by the push rod to pivot about the backrest supports, effecting a parallel or near-parallel displacement of the actuator link towards or away from the backrest in the pivoting motions of the backrest. The first and second link members thus support the actuator link substantially in parallel with the backrest in all pivotal positions of the backrest.

Alternative embodiments of the first and second link members may include circular discs, straight rod links, angular or curved rod links such as C-shaped, S-shaped, Z-shaped, L-shaped, or V-shaped rod links, etc. Essentially, the first and second link members are configured to allow the actuator link the required length of displacement. Advantageously, and in order to limit the structural dimensions of the chair, the first and second link members may be configured to allow the actuator link to pass on a side of the pivotal connections through which the first and second link members are pivotally connected to the backrest.

In a preferred embodiment the runner in the end of the lever arm is a rotating wheel, although in the alternative the runner may be a non-rotating low-friction element. In a preferred embodiment, the sliding engagement between the runner and actuator link results from gravity, the runner freely resting or rotating on a surface of the actuator link under the weight of the armrest. In other embodiments, the engagement between the runner and actuator link may result from insertion of the runner into a longitudinal recess formed on the actuator link.

Likewise in a preferred embodiment, the armrest's pivotal connection to the backrest is arranged on a sleeve that is slidable on an elongate guide bar which runs in the longitudinal direction of the backrest. A stopper is advantageously arranged on the sleeve to engage the guide bar at fixed, or at non-fixed, locations of adjustment. Preferably, the guide bar and runner guide both have length dimensions that allow the adjusting sleeve a range of adjustment in the order of at least 100 mm, preferably in the order of 100-250 mm.

In a multi function chair, further comprising a mobile carriage to which the seat is pivotally connected, the link mechanism is journalled at the carriage and at the seat, respectively. The link mechanism is operatively connected to the armrest, and in the pivoting motion of the backrest and/or the pivoting motion of the seat, the link mechanism actuates the armrest in pivoting motion about the pivotal connection to the backrest. In this embodiment, the link mechanism comprises first and second link members, each in succession pivotally supported on the backrest, the first and second link members being interconnected by a push rod which, in an inner end thereof, is pivotally connected to a pivot link that is journalled to the carriage and to the seat, respectively.

The pivot link includes first and second pivotally interconnected pivot link members, the first pivot link member pivotally connected to the seat and the second pivot link member pivotally connected to the carriage. The angular displacement of the first pivot link member relative to the seat is limited by means of a pivot stop arranged on the seat.

Further details and advantages will be appreciated from the following detailed description of preferred embodiments of the invention.

SHORT DESCRIPTION OF THE DRAWINGS

The invention is more closely explained below with reference to the attached diagrammatic drawings. In the drawings, FIG. 1 illustrates the prior art multi function chair discussed in the background;

FIGS. 2*a* to 2*d* illustrate a typical range of adjustability in a multi function chair;

DETAILED DESCRIPTION OF PREFERRED EMBODIMENTS

In the following, "inner" and "outer" explains the relative position of elements as related to a pivotal connection between a seat and a backrest in a chair or a multi function chair. The expressions "first" and "second" refer to the succession of elements as viewed from said pivotal connection between seat and backrest.

Notable, in the schematic drawings and description, seat cushioning and upholstery is omitted for the sake of clarity. Also to be noted, the reference to seat and backrest shall be understood as referring to any adequate component that is comprised in the structures of seat and backrest, respectively.

Figure 1:
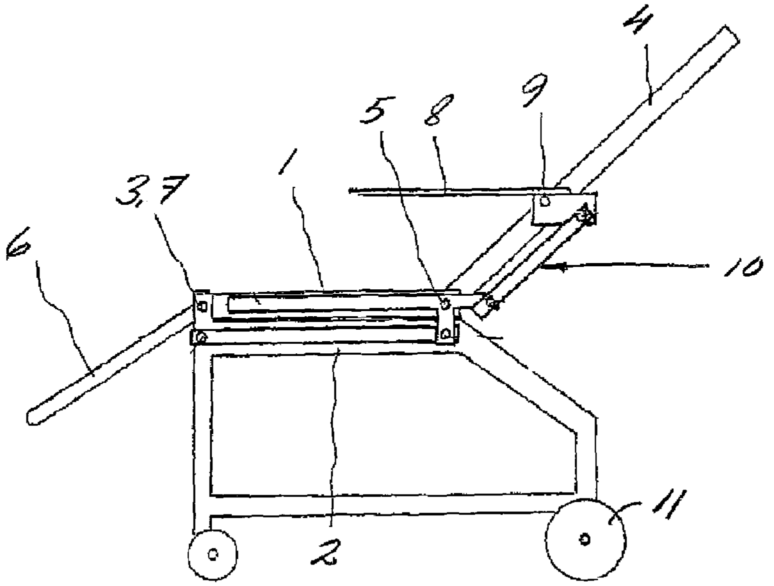
Fig. 1 (PRIOR ART)

Returning initially to the prior art chair of FIG. 1, a seat 1 is pivotally connected in a forward end to an undercarriage 2, at a pivotal connection 3. In the rear end of the seat 1, a backrest 4 is arranged pivotally to the seat at pivotal connection 5. A leg rest 6 may likewise be arranged pivotally to the seat at a pivotal connection 7, opposite the backrest and in the forward end of seat 1. An armrest 8 is pivotally arranged on the backrest 4 at a pivotal connection 9. Typically, an armrest 8 will be attached to each side of the backrest. A link mechanism 10 is journalled at or near the seat 1 as well as to the backrest 4, and operative for pivoting the armrest about its pivotal connection 7 in result of changing the angular relation between the backrest and the seat. Wheels 11 may be arranged on the undercarriage to permit mobility of the chair. A footrest attached to the free lower end of the leg rest 6 is not contemplated in this prior art chair, neither is a machinery supported on the undercarriage for adjusting the height of the seat above the floor. Theses modifications are however included in the known art and of less importance for the present invention.

Figure 2A:
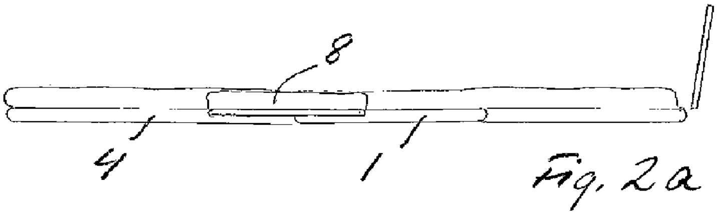
Figure 2B:
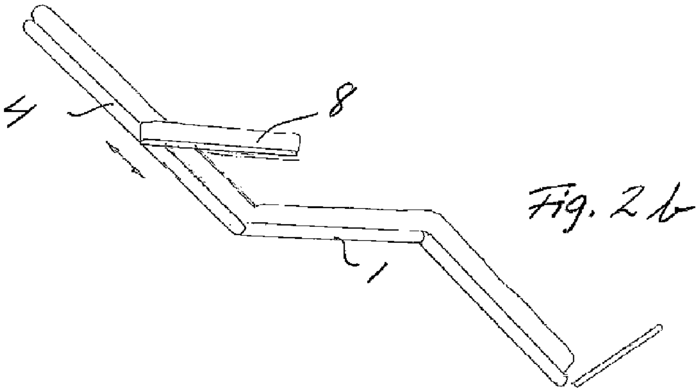
Figure 2C:
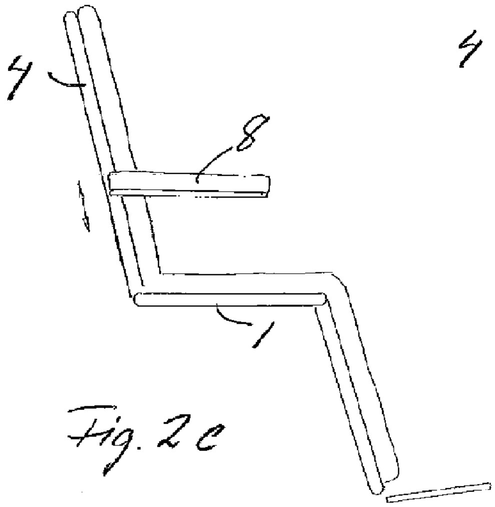
Figure 2D:
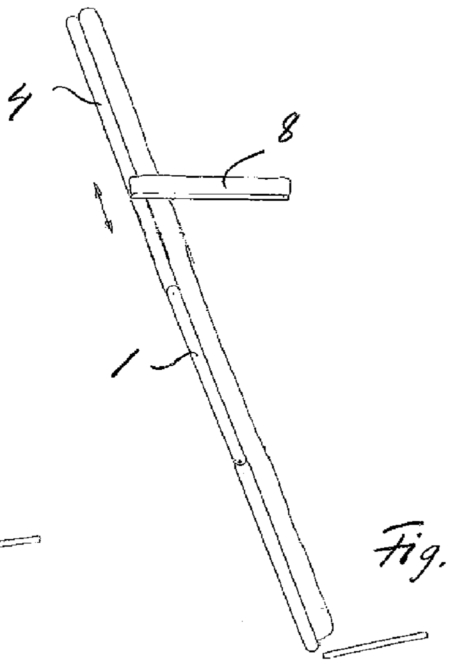

The structure of FIG. 1 permits a range of adjusted positions as illustrated schematically in FIGS. 2*a*-2*d*. Thus, FIG. 2*a* illustrates a bed condition wherein seat, backrest and leg rest are all aligned and substantially horizontal, the armrest 8 pivoted to extend substantially in the planes of the seat 1 and the backrest 4. FIG. 2*b* illustrates a reclining condition wherein the backrest and a leg rest are pivoted slightly with respect to the seat. Through its operative engagement with the link mechanism, the armrest 8 is pivoted to substantially maintain its true angular position from FIG. 2*a*. In FIG. 2*c*, the backrest and leg rest are further pivoted into a seating condition, wherein the armrest 8 still maintains its angular position from FIGS. 2*a* and 2*b*. FIG. 2*d* illustrates an upraised or standing condition wherein the seat 1, backrest 4 and leg rest 6 are again substantially aligned. Also in the standing condition of FIG. 2*d*, the armrest 8 maintains its angular position from the previous conditions.

A multi function chair that is adjustable as illustrated in FIGS. 2*a*-2*d* is useful, not only in the nursing of immobilized patients, but also in office life, for personal transport, for reclining purposes in domestic or public life, and more.

However, user comfort and operability can still be enhanced as will be explained below with reference to FIGS. 3-6.

Figure 3:
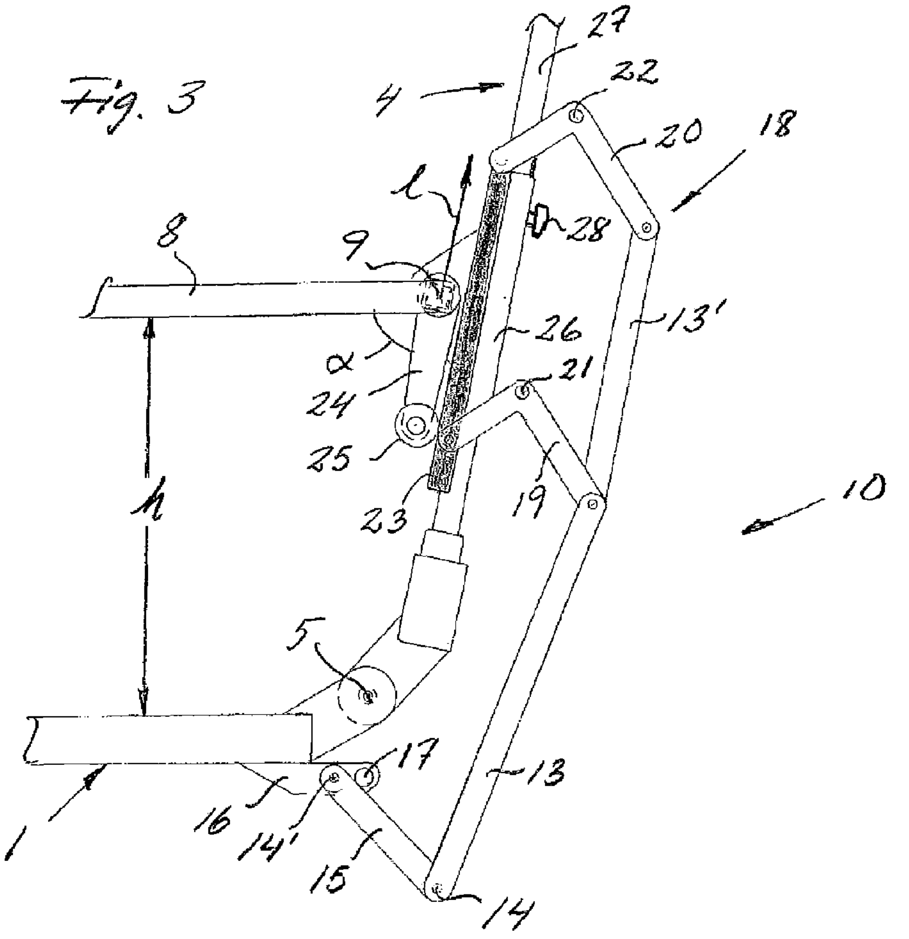
FIG. 3 is a side view showing a cut out portion of the chair in a seating condition.
Figure 4:
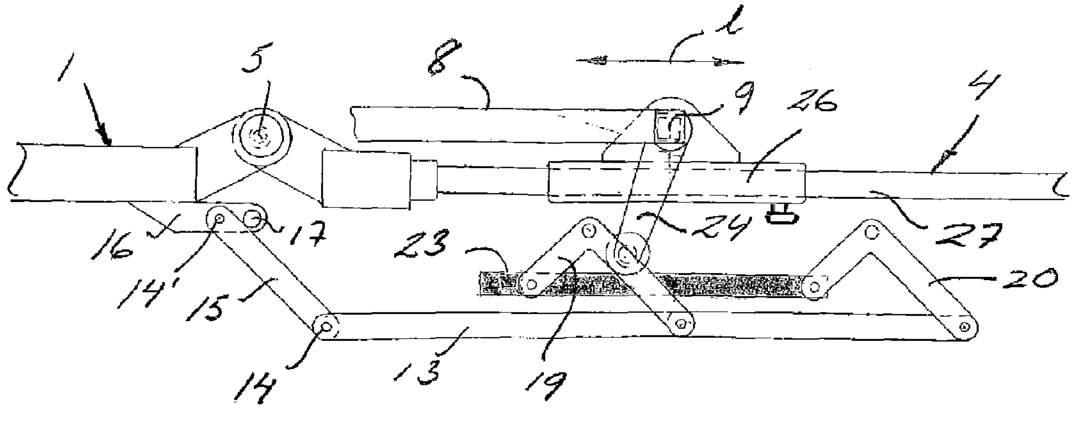
FIG. 4 is a side view showing the corresponding portion of the chair in a bed condition.

In a first aspect illustrated in FIGS. 3 and 4, a chair according to the present invention comprises a link mechanism that is arranged for pivoting and control of an armrest that is adjustable with respect to its height above the seat.

In FIG. 3, a cut out portion of the chair is shown in a condition for seating or reclining purpose as illustrated in FIGS. 2*b* and 2*c*. At pivotal connection 5, a backrest 4 is pivotally connected to a seat 1 and adjusted into a seating position. An armrest 8 is pivotally connected to the backrest 4 at pivotal connection 9. A link mechanism, generally referred to by reference numeral 10, comprises a push rod 13 which in an inner end thereof is journalled to or near the seat 1, at pivotal connection 14. More precisely, the pushrod is pivotally connected to the seat via an intermediate link member 15, in turn journalled on a bracket 16 comprised in the seat structure. A pivot stop 17 on the bracket limits the angular displacement of intermediate link 15 about pivotal connection 14'.

In its outer end, the push rod 13 is pivotally connected to a parallel link mechanism generally denoted 18. The parallel link mechanism 18 comprises first and second parallel link members 19 and 20, each in succession pivotally connected to the backrest through pivotal connections 21 and 22, respectively. In the illustrated embodiment the first and second parallel link members 19, 20 are V-shaped, facing inwards from the pivotal connections 21, 22 which are arranged in the pointed ends of the V-shaped link members. In their outer ends, the parallel link members 19, 20 are interconnected through a push rod extension 13'. In their inner ends, the parallel link members 19, 20 are interconnected through an actuator link 23 that is supported in the length direction of the backrest 4, typically in parallel or substantially in parallel therewith. In the pivoting motion of the parallel link members 19, 20 about the pivotal connections 21, 22, generated from pivoting of the backrest about the pivotal connection 5 and transferred via push rod 13 and push rod extension 13', the actuator link 23 is displaced mainly sideways or in a lateral direction. The actuator link 23 is thus displaced towards or away from the backrest, in dependence of the pivoting direction (forward/rearward) of the backrest. Preferably, the actuator link 23 is displaced in parallel with the backrest through the correspondingly shaped and dimensioned elements included in the parallel link mechanism 18. In the alternative though, the parallel link mechanism 18 may be structured for a progressively changing and non-parallel displacement of the actuator link 23 if desired, though still mainly in the length direction of the backrest 4.

Through the actuator link 23, the link mechanism 10 operatively engages the armrest 8 for pivoting motion about the pivotal connection 9, resulting from the sideways displacement of the actuator link. To this end the actuator link engages a lever arm 24 which in an inner end adjoins the armrest 8, at or near the pivot connection 9. The lever arm 24 adjoins the armrest preferably at an angle α which is less than 90°, such as in the order of 45-85°, and even more preferably in the order of 60-80°. The angle α is related to the angular relation between the seat and the backrest in a normal seating condition, wherein the armrest typically is in parallel with the seat. The opposite outer end of the lever arm 24 provides a sliding engagement with the actuator link 23, in displacement driving or controlling the lever arm and armrest to pivot about the pivotal connection 9. The sliding engagement may be provided from a low-friction element, such as a wheel, which is supported in the end of the lever arm 24 to form a runner 25. The runner 25 may be arranged as illustrated to run on a surface externally on the actuator link 23, or may alternatively be inserted to run in an elongate slot formed in the actuator link 23, the latter in both cases forming a runner guide 23 for the runner 25.

The armrest 8 is pivotally arranged on a sleeve 26 which is sliding on a guide bar 27 comprised in the structure of the backrest 4. In effect of its sliding support, the armrest 8 is arranged adjustable with respect to its height h above the seat 1 through a corresponding displacement of the sleeve in the longitudinal direction 1 of the backrest 4. A stopper 28 can be arranged on the sleeve to engage the guide bar at fixed, or at non-fixed, locations of adjustment. The guide bar 27 and actuator link 23 both have a length which is dimensioned to allow the sleeve 26 a range of adjustment in the order of at least 100 mm, preferably in the order of 100-250 mm.

In FIG. 4, a corresponding cut out portion of the chair is illustrated in the bed condition. From the two figures one will realize that in all pivotal positions of the backrest, the armrest 8 is free to pivot upwards about the pivotal connection 9. Likewise to be seen, the parallel link mechanism 18 and actuator link 23 are neutralized and powerless in the fully assumed bed condition. In result of the pivot limiter 17 which engages the push rod 13 via the intermediate link 15, the link mechanism instantly resumes its actuating and supporting function when the backrest is pivoted upwards from the bed condition.

Figure 5:
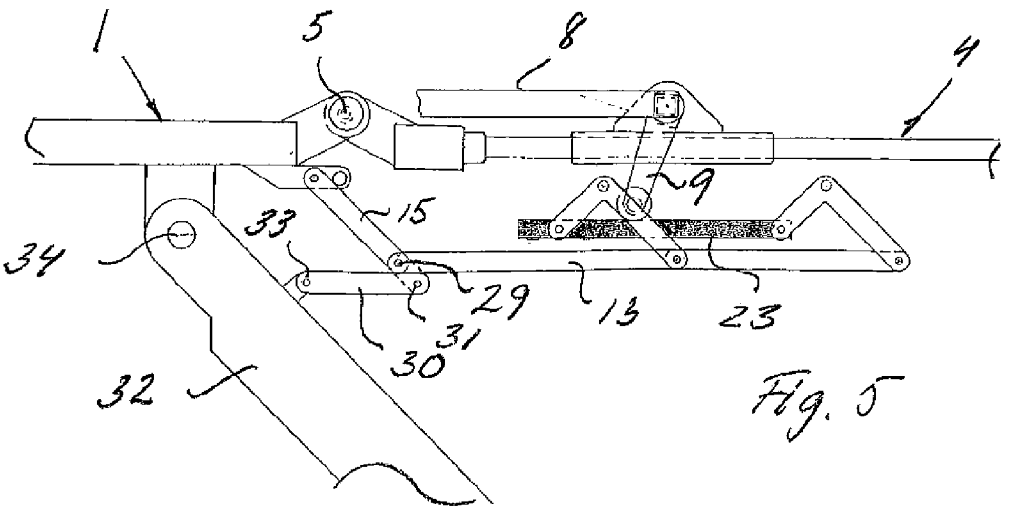
FIG. 5 is a side view showing a cut out portion of a multi function chair adjusted into a bed condition.
Figure 6:
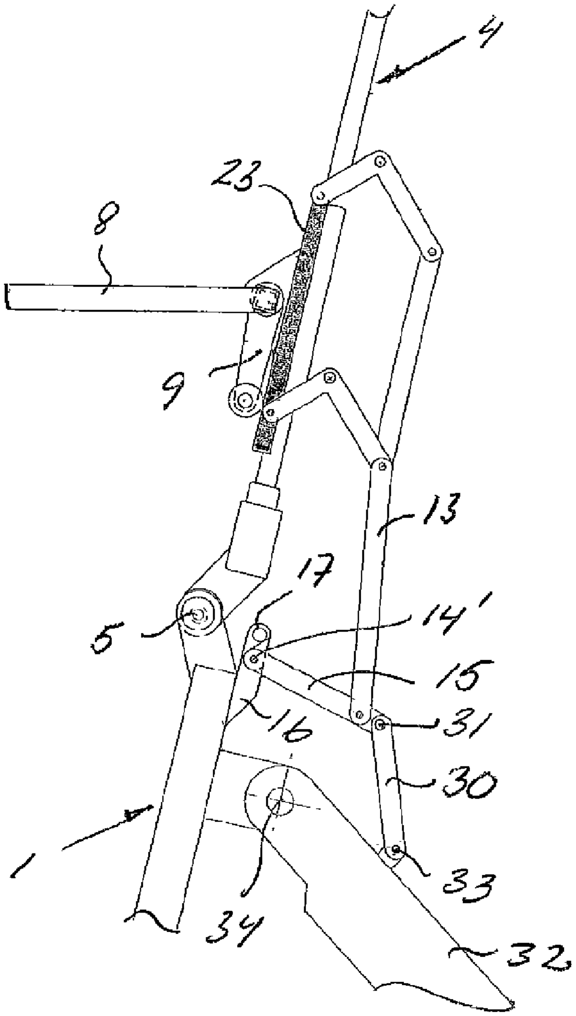
FIG. 6 shows in a corresponding view the multi function chair of FIG. 5 adjusted into a standing condition.

FIG. 5 is a view similar to FIG. 4, illustrating however the present invention in a second aspect as applied in a multi function chair that is adjustable into an upright standing condition (shown in FIG. 6). The embodiment illustrated in FIGS. 5 and 6 corresponds with the previous embodiment, except for the journal of the push rod 13 to the chair. More precisely, in the multi function chair application the intermediate link 15 is extended past its pivot connection 29 with the push rod 13, and is in the extended end pivotally connected to an additional link member 30 through a pivotal connection 31. The latter is in turn pivotally anchored to the undercarriage 32 at a pivotal connection 33. The link member 30 is inactive in any isolated pivotal displacement of the backrest 4 relative to the seat 1, in which the link mechanism operates as discussed above. However, in the multi function chair application, the seat 1 is also pivotally arranged on the undercarriage through a pivotal connection 34, by which the seat is pivotable into a standing condition as illustrated in FIG. 6. In this position, the additional link member 30 causes intermediate link 15 to pivot about pivotal connection 14', effecting via push rod 13 an activation of the parallel link mechanism 18 for displacement of the actuator link 23 towards the backrest 4.

A link mechanism 10, 18 may be arranged on each side of the chair, supporting a respective armrest 8. Alternatively, a singular link mechanism 10, 18 may be arranged on one side of the chair, or centrally with respect to the backrest, operatively engaging a transverse rod linking together the lever arms 24 of two armrests 8.

The invention claimed is:

1. A chair comprising a seat (1) structure and a backrest (4) structure arranged pivotally to the seat structure;

- an armrest (8) arranged pivotally to the backrest structure through a pivotal connection (9);
- a link mechanism (10, 18) that is journalled to the structures of the seat and the backrest, respectively, wherein the armrest (8) is adjustable in a length direction of the backrest by means of the pivotal connection (9) being arranged displaceable on the backrest structure, and in that the pivotal orientation of the armrest (8) is controlled via a sliding engagement between a lever arm (24), adjoining the armrest at an angle thereto, and an actuator link (23) comprised in the link mechanism and displaceable thereby with respect to the backrest so as to extend substantially in the length direction of the backrest in all its positions of displacement.

2. The chair of claim 1, wherein the actuator link (23) is comprised in a parallel link mechanism (18) journalled on the backrest structure, and driven through a pushrod (13) journalled on the seat structure.

3. The chair of claim 2, wherein the parallel link mechanism (18) is arranged to move the actuator link (23) in parallel displacements toward or away from the backrest in result of a change of pivotal position of the backrest with respect to the seat.

4. The chair of claim 3, wherein the parallel link mechanism (18) comprises first (19) and second (20) link members, each in succession pivotally supported (21, 22) on the backrest structure, the first and second link members in their outer ends interconnected by a push rod (13') and in the remote inner ends supporting the actuator link (23) in parallel with the backrest, in all pivotal positions of the backrest.

5. The chair of claim 1, wherein the lever arm adjoins the armrest at acute angle (α) thereto.

6. The chair of claim 1, wherein the sliding engagement between the lever arm (24) and the actuator link (23) is provided through a runner (25) arranged in the end of the lever arm to run against the actuator link.

7. The chair of claim 6, wherein the runner (25) is a rotating wheel.

8. The chair of claim 1, wherein the engagement between the lever arm (24) and the actuator link (23) results from gravity, the lever arm resting freely onto a surface of the actuator link under the weight of the armrest (8).

9. The chair of claim 1, wherein the armrest's pivot connection (9) is arranged on a sleeve (26) sliding on an elongate guide bar (27) comprised in the backrest structure and running in the length direction of the backrest.

10. The chair of claim 9, further comprising a stopper (28) arranged on the sleeve to engage the guide bar at fixed, or at non-fixed, locations of adjustment.

11. The chair of claim 10, wherein the guide bar (27) and the actuator link (23) both have a length dimensioned to allow the sleeve (26) a range of adjustment in the order of at least 100 mm, preferably in the order of 100-250 mm.

12. The chair of claim 9, wherein the guide bar (27) and the actuator link (23) both have a length dimensioned to allow the sleeve (26) a range of adjustment in the order of at least 100 mm, preferably in the order of 100-250 mm.

13. A chair according to claim 1, further comprising a mobile carriage (32);

a pivotal connection (34) between the mobile carriage (32) and the seat structure (1), wherein the push rod (13) in its inner end is journalled to a link member (15) which is pivotally connected to the seat structure (1) and comprised in a pivotal link (15, 30), the other link member (30) of which is pivotally connected to the mobile carriage (32).

* * * * *